Dec. 30, 1969   W. P. CONLIN   3,486,771
CONNECTOR FITTING
Filed Sept. 30, 1968
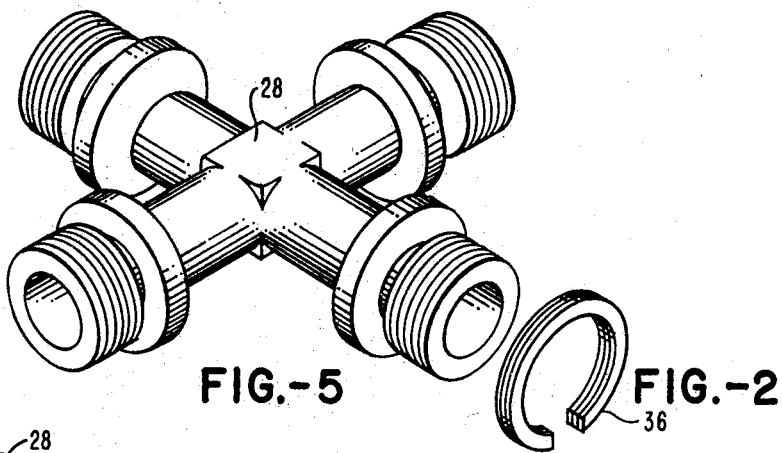
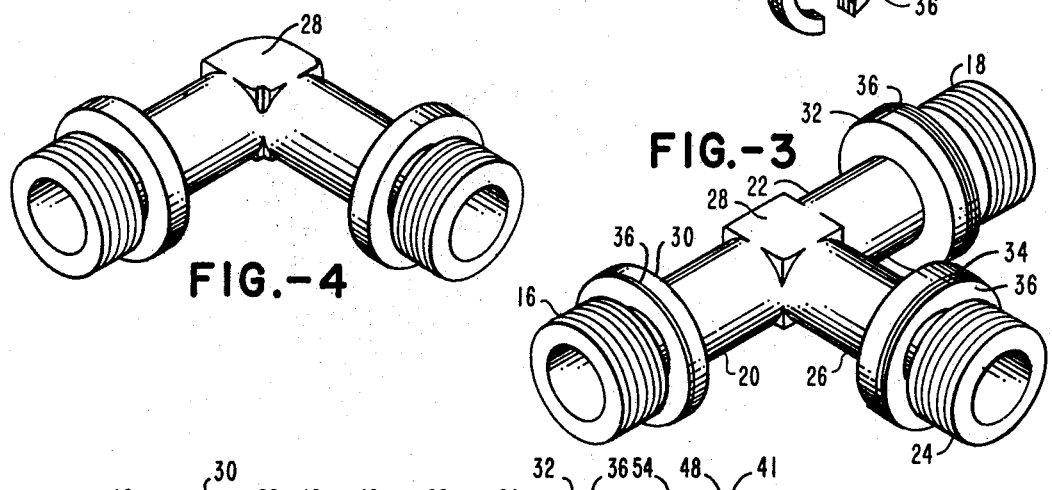
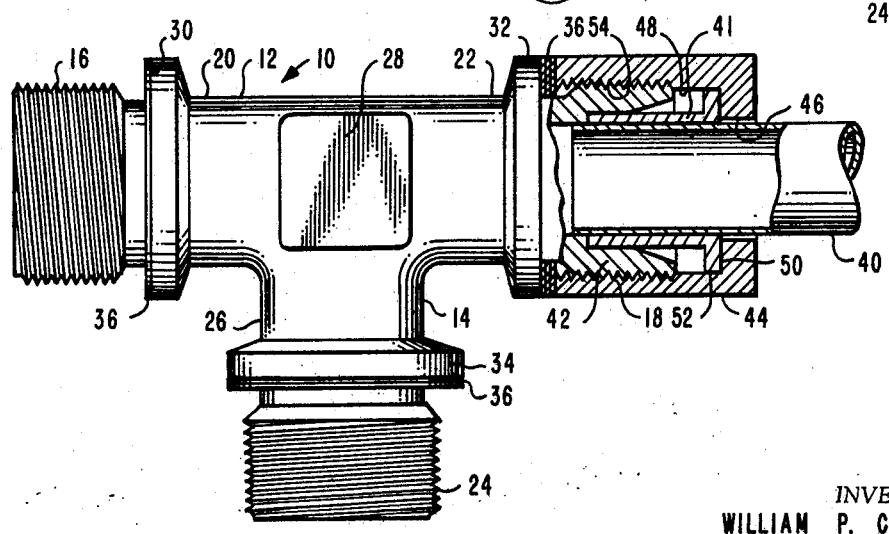
INVENTOR.
WILLIAM P. CONLIN
BY
ATTORNEY

United States Patent Office

3,486,771
Patented Dec. 30, 1969

3,486,771
CONNECTOR FITTING
William P. Conlin, North Hollywood, Calif., assignor to Tech Aero Incorporated, North Hollywood, Calif.
Continuation-in-part of application Ser. No. 662,817, Aug. 23, 1967. This application Sept. 30, 1968, Ser. No. 763,503
Int. Cl. F16l *19/00, 41/02*
U.S. Cl. 285—39             2 Claims

ABSTRACT OF THE DISCLOSURE

This invention involves connector fittings for thin walled hydraulic tubes in aircraft where the connector fittings have the same geometry as prior connector fittings so that they are completely interchangeable. This connector fitting is characterized by a decreased intermediate wall thickness in order to decrease the weight of the connector. In addition, to prevent leakage, when the connector fitting is attached to a thin walled tube, adjustable abutments or stops are secured to the connector fitting associated with each threaded portion. These abutments or stops are so positioned that when the securing nut on the thin walled tube is tightened up against the stop the tightness of the nut is sufficient to prevent high pressure hydraulic fluid from leaking out over the threads and at the same time the tightness of the nut is not so great as to cause a deformation of the thin walled tube which would itself cause leakage of hydraulic fluid.

---

This invention relates generally to a connector fitting and more particularly a connector fitting for use in aircraft hydraulic systems. This application is a continuation-in-part of patent application No. 662,817 filed Aug. 23, 1967.

BRIEF SUMMARY

In aircraft design, a savings in the weight of components, without the sacrifice of strength or reliability is an important object. This is true for conventional airplanes and it is even more important in the area of supersonic airplanes. This is because in high speed aircraft a savings of only pounds produces a disproportionately large increase in the range of the aircraft or results in a large decrease in fuel consumption. Since modern aircraft employ hydraluic systems for many control operations the weight of the tubing and the connector fittings is an important factor. It is very common in airplane hydraulic systems to use thin walled unthreaded tubing which has to be connected with threaded connector fittings. In the past, the connection of these thin walled tubings to the connector fittings was cause of a certain amount of undesirable leakage in the hydraulic systems. This was because the securing nuts attached to the thin walled tubing, when tightened too much onto the connector fitting, would deform the thin walled tube and produce leakage. On the other hand, if the securing nut was not tightened sufficiently, the high pressure hydraulic fluid would leak out of the hydraulic system over the threads. Consequently, to prevent leakage, the securing nut had to be tightened very carefully and with just enough pressure.

In this invention, adjustable stops or abutments are secured to the connector fittings and are positioned in such a place that when the securing nuts associated with the thin walled tubing are tightened against the abutment or stops there is just enough pressure to prevent leakage of the hydraulic fluid over the threads of the securing nuts and not too much pressure to deform the thin walled tube and cause leakage.

The securing nuts attached to the thin walled tubing are subject to a certain amount of unavoidable manufacturing tolerances and to compensate there has to be some means for adjusting the position of the abutments or stops on the connector fitting. This is done in the present invention through the use of a combination of a fixed stop or abutment integrally formed with the connector fitting and a laminated series of washers embracing the connector fittings and abutting a stop. In this way, if, because of manufacturing tolerances, the securing nut cannot be tightened enough to prevent leakage over the threads, the laminated washers can be stripped sufficiently to permit additional tightening of the securing nut. Alternatively, if the manufacturers tolerances are such that by the time the securing nut would abut against the fixed abutment or stop the thin walled tube would deform, additional laminations of the washer can be inserted in front of the abutment or stop to shift the nut engaging surface of the abutment to prevent this from happening.

What is needed therefore and comprises an important object of this invention is to provide a connector fitting for aircraft hydraulic systems which is designed for use with thin walled hydraulic tubs and which is substantially lighter than prior connector fittings. Another object of this invention is to provide a light weight connector fitting for thin walled hydraulic tubes which has the same geometry as prior connector fittings, so they can be interchanged.

A further object of this invention is to provide a connector fittings with adjustable means for regulating the tightness of the securing nut on thin walled tubes when threaded on the connector fittings in order to prevent deformation of the thin walled tube or to prevent leakage over the threads of the connector fitting.

This and other objects of this invention, will become more apparent when better understood in the light of the accompanying drawings and specification wherein:

FIGURE 1 is a T-shaped fitting, partly in section, showing the coaction between the fixed abutment or stop on the connector fitting and the securing nut of the thin walled tube.

FIGURE 2 is a perspective view of the laminated washer cooperating with the fixed abutment or stop on the connector fitting.

FIGURE 3 is a perspective view of a T-shaped connector fitting constructed according to the principles of this invention.

FIGURE 4 is a perspective view of an L-shaped connector fitting constructed according to the principles of this invention.

FIGURE 5 is a perspective view of a cross-shaped connecter fitting constructed according to the principles of this invention.

Referring now to FIGURE 1 of the drawing, a T-shaped connector fitting, indicated generally by the reference numeral 10, and selected only for the purpose of illustration of the principles of this invention, is formed from a suitable light weight material such as aluminum alloy. The connector fitting includes the main tubular portion 12 and a tubular portion 14 at right angles at the tubular portion 12. As shown in FIGURE 1, tubular portion 14 is centrally disposed between the ends of portion 12.

Tubular portions 12 and 14 communicate with each other. The opposed end portions 16 and 18 of tubular portion 12 are provided with standard style threads for connection with securing nuts on the thin walled tubing of a hydraulic system in a manner well known in the art. The wall thickness of portions 20 and 22 adjacent to the threaded end portions 16 and 18 is reduced, leaving portions 20 and 22 with a reduced outside diameter in the embodiment shown. However, the inside diameter of the tubular fitting is uniform and standard. The decreased wall thickness resulting from this arrangement substantially decreases the weight of the connector fitting. Similarly, tubular portion 14 has an end portion 24 with a standard size thread or connection tubing well known in the art. In addition, tubular portion 26 adjacent end portion 24 also has a reduced outside diameter, but in this particular embodiment the inside diameter for tubular portion 14 is uniform and standard and conforms to the geometry of prior hydraulic connector fitting of the same size.

A wrench pad 28 is integrally formed between tubular portions 20, 22 and 26. As seen in FIGURES 1 and 3, the wrench pad has generally parallel upper and lower surfaces. The edges of the wrench pad are stepped down slightly to join the surface of the intermediate portion of the connector fittings. The reduced sides of the wrench pad make it possible to work on the connector fittings with a smaller wrench and in a much reduced space than was heretofore possible. In addition, because less space is required, connector fittings in the entire hydraulic system can be mounted closer to the inner walls or bulkhead of the aircraft. Consequently, less structural edge distance and clearance is required. This has the effect of increasing the useful volume of the aircraft.

As shown in FIGURE 1, fixed abutments or stops 30, 32 and 34 are integrally formed with the connector fitting. The diameter of the abutments or stops is slightly larger than the diameter of the threaded end portions 16, 18 and 24 as shown in FIGURE 1. This gives the abutments or stops the added function of protecting the threads against damage and consequent leakage caused by accidental blows or by being dropped. In addition, laminated split or horseshoe shaped washers 36 embrace end portions 20, 22 and 26 of the connector fitting bearing against the fixed stops or abutments 30, 32 and 34 (see FIGURE 2) for reasons to become more apparent below.

The thin walled hydraulic tubes 40 are unthreaded. In order to secure these tubes to the threaded connector fittings a stop sleeve 41 is slipped over the end of the thin walled hydraulic tube 40. The stop sleeve is generally tubular and cylindrical (in the present embodiment) and is provided with an enlarged base or flange portion 42. This base or flange portion 42, as will be described below, serves as an abutment for the base of the securing nut 44.

The base or securing nut is generally cylindrical in shape with a bore 46 extending therethrough. Bore 46 in the securing nut is substantially equal in diameter to the diameter of the thin walled tube 40. Securing nut 44 is also counter bored at 48. The diameter of the counter bore 48 is substantially equal to the diameter of the threads 16 and 18 and this counter bore of the securing nut has internal threads whereby the securing nut can be threaded onto the threaded portions 16, 18 or 24 of the connector fitting.

To assemble the securing nut 44 on the thin walled hydraulic tube the securing nut 44 is first inserted over the end of the thin walled tube 40 with the end of the thin walled tube 40 passing through the bore 46 of the securing nut. Thereafter the stop sleeve 41 is slid over the end of the securing nut. Next, the internal diameter of the thin walled tube is expanded by any suitable means in order to rigidly secure the stop sleeve to the surface of the thin walled tube. With this arrangement the securing nut 44 is then moved forward until its base surface 50 abuts against the base surface 52 of the flanged portion of the stop sleeve. With this arrangement the securing nut cannot be removed from the thin walled tube but is clearly rotatable thereon. With this arrangement the internal threads 54 of the securing nut can be screwed onto the external threads of the connector fitting to secure the thin walled tube to the connector fitting.

As stated above, if the securing nut 44 is tightened too much on the connector fitting the thin walled tube could be deformed and this could provide an escape path for the hydraulic fluid in the hydraulic system. On the other hand, if the securing nut is not tightened sufficiently, the hydraulic fluid could escape over the threads. To prevent this from happening the cylindrical stops 30, 32 and 34 are positioned on the connector fitting in such a position so that when the securing nut is screwed until it abuts against the stops the securing nut will be tight enough to prevent leakage through the threads and at the same time it will not deform the thin walled tube.

Manufacturing tolerances or uncontrolled variations in the location of the stop sleeve might result in a situation where at the time the securing nut is screwed into contact with the abutments or stops the pressure is either too much and causes the thin walled tube to deform or the pressure is not enough so that hydraulic fluid can escape over the threads. To prevent this from happening an adjustment is provided. This adjustment is provided by laminated split washers 36. These washers are slipped over the ends 20, 22 and 26 of the connector fitting and bear against the stops 30, 32 and 34 and have the effect of increasing the thickness of the stops or locating the position of the stop closer to the threaded end portions of the connector fittings. With this arrangement, if when the securing nut is tightened the pressure is insufficient to prevent leakage it is only necessary to back off the securing nut and remove one or more laminations to permit the securing nut to be retightened to its proper amount. In this way, the connector fitting provides an adjustable stop for use with the securing nut.

The stops 30, 32 and 34, as stated above, have the initial function of protecting the threads of the connector fitting against damage because being larger than the diameter of the threads they maintain the threads away from the surface on which the connector fitting rests. Heretofore, one source of leakage in high pressure hydraulic systems has been caused by damage due to the threads on the connector fittings.

FIGURES 4 and 5 show other embodiments of a connector fitting employing the principles of this invention. These drawings were included to point out that the principles of this invention are applicable to connector fittings of all kinds and all configurations and not simply the T-shaped fitting shown in FIGURE 1.

Obviously, many modifications and variations of the present invention are possible in the light of the above teachings.

I claim:

1. The connector fitting of the class described comprising a generally tubular portion having an intermediate portion and threaded end portions, the wall thickness of the intermediate portion less than the minimum wall thickness of the end portions, the outside diameter of the threaded portions larger than the outside diameter of the intermediate portion, reinforcing wrench pads, said wrench pads integrally formed with said intermediate portions and having planar upper and lower surfaces generally tangent with the upper and lower surfaces of the intermediate portions, said threaded end portions having counter bored portions of cylindrical configurations terminating in a shoulder normal to the axis of the threaded end portions, the counter bored portions of said connector fitting adapted to receive a thin walled tube having a collar portion thereon, said collar portion having an end portion complementary to said shoulder and adapted to abut said shoulder in assembled relation, and adjustable securing nut stops associated with each threaded end portion, said adjustable securing nut stops positioning an abutment surface for engaging the end of a securing nut rotatably mounted on the end of a thin walled tube and bearing against said collar portion in such a way that when the securing nut is threaded onto the threaded portion of the connector fitting until it abuts against the abutment surface, the end portion of the collar portion will bear against said shoulder and the connection between the securing nut stop and the threaded end portion of the connector fitting will be tight enough to prevent leakage of hydraulic fluid without deforming the thin walled tube.

2. The connector fitting described in claim 1 wherein said stops comprise ring-shaped flanges integrally formed with said connector fitting, the diameter of said ring-shaped stops larger than the diameter of the threaded end portions of the connector fittings to protect the threaded end portions from contact with a supporting surface, and laminated split washers embracing the external surface of the intermediate portions bearing against said stops to provide means for shifting the position of the surface of the abutment along the connector fitting.

References Cited

UNITED STATES PATENTS

| | | | |
|---|---|---|---|
| 529,146 | 11/1894 | Vanderman | 285—179 |
| 531,245 | 12/1894 | Anderson | 85—50 X |
| 1,497,398 | 6/1924 | Axelson et al. | 285—39 |
| 2,342,425 | 2/1944 | Parker | 285—179 X |
| 2,349,170 | 5/1944 | Jackman | 285—354 |
| 2,413,878 | 1/1947 | Maky | 285—179 X |
| 2,540,368 | 2/1951 | Hording | 285—354 X |
| 2,777,714 | 1/1957 | Lamphere | 285—179 X |
| 2,988,385 | 6/1961 | Foelster et al. | 285—354 X |
| 3,416,818 | 12/1968 | Conlin | 285—39 |

DAVID J. WILLIAMOWSKY, Primary Examiner

D. W. AROLA, Assistant Examiner

U.S. Cl. X.R.

85—50; 285—150, 354